(12) United States Patent
Carey et al.

(10) Patent No.: US 6,452,761 B1
(45) Date of Patent: Sep. 17, 2002

(54) MAGNETO-RESISTIVE AND SPIN-VALVE SENSOR GAP WITH REDUCED THICKNESS AND HIGH THERMAL CONDUCTIVITY

(75) Inventors: Matthew Joseph Carey; Jeffrey Robinson Childress; Robert Edward Fontana, Jr., all of San Jose; Bruce Alvin Gurney, San Rafael; Stuart Stephen Papworth-Parkin; Ren Xu, both of San Jose, all of CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/483,087

(22) Filed: Jan. 14, 2000

(51) Int. Cl.$^7$ ................................................ G11B 5/33
(52) U.S. Cl. ..................................... 360/320; 29/603.13
(58) Field of Search ................................. 360/320, 314, 360/315, 324, 325, 119, 126; 29/603.13, 603.14, 603.15

(56) References Cited

U.S. PATENT DOCUMENTS

| | | | |
|---|---|---|---|
| 5,302,461 A | | 4/1994 | Anthony ..................... 428/472 |
| 5,999,379 A | * | 12/1999 | Hsiao et al. ................. 360/320 |
| 6,055,136 A | * | 4/2000 | Gill et al. .................... 360/314 |
| 6,188,549 B1 | * | 2/2001 | Wiitala ........................ 360/320 |
| 6,195,229 B1 | * | 2/2001 | Shen et al. .................... 216/22 |
| 6,209,193 B1 | * | 4/2001 | Hsiao ........................... 216/22 |
| 6,215,630 B1 | * | 4/2001 | Schultz et al. ............... 360/320 |
| 6,252,749 B1 | * | 6/2001 | Hayakawa ................... 360/320 |
| 2001/0021537 A1 | * | 9/2001 | Shimazawa .................... 438/3 |
| 2001/0028917 A1 | * | 10/2001 | Sasaki ........................ 427/130 |

\* cited by examiner

Primary Examiner—Brian E. Miller
Assistant Examiner—Tianjie Chen
(74) Attorney, Agent, or Firm—Lumen Intellectual Property Services, Inc.

(57) ABSTRACT

The current invention provides for magnetic sensor devices with reduced gap thickness and improved thermal conductivity. Gap structures of the current invention are integrated in laminated Magneto-Resistive and Spin-Valve sensors used in magnetic data storage systems. The gap structures are produced by depositing metal layers and oxidizing portions of or all of the metal layers to form thin high quality oxidized metal dielectric separator layers. The oxidized metal layer provides for excellent electrical insulation of the sensor element and any remaining metallic portions of the metal layers provide a thermally conducting pathway to assist the dissipation of heat generated by the sensor element. Because of the combined qualities of electrical insulation and thermal conductivity, magnetic sensor devices of this invention can be made with thinner gap structures and operated at higher drive currents. Further, oxidized metal layers provide suitable surfaces to growing oxidized metal gap insulator layers of any thickness.

18 Claims, 7 Drawing Sheets

MAGNETO-RESISTIVE AND SPIN-VALVE SENSOR GAP WITH REDUCED THICKNESS AND HIGH THERMAL CONDUCTIVITY

FIELD OF THE INVENTION

This invention relates to magnetic sensor devices used in data storage systems. More particularly, the invention relates to oxidized metal insulator layers used in magnetic sensor devices.

BACKGROUND

Metal-oxide layers are used in laminated magnetic sensor devices as gap insulator layers to electrically isolate the magnetic sensing elements. For example, a typical magneto-resistive or spin-valve sensor device has a multi-layer magnetic sensor element integrated between two metal-oxide layers. The metal-oxide layers are surrounded by metallic magnetic shields, which define the operational width of the sensor device. The metal-oxide gap insulator layers that are laminated between the magnetic shields and the magnetic sensor element prevent shorting between the shields and sensor layers.

Magnetic sensor devices, similar to that described above, are usually made in a sequential deposition process, wherein each layer of the sensor device is deposited one after the other. For example, a magnetic shield layer, usually a NiFe alloy, is deposited on a suitable substrate. On the magnetic shield layer a first metal-oxide gap insulator layer is deposited followed by the formation of the multi-layer magnetic sensor element, the deposition of a second metal oxide gap insulator layer and deposition of a capping magnetic shield layer.

Metal-oxide gap insulator layers are commonly made of $Al_2O_3$ deposited reactively from atomized Al particles in an oxygen-containing environment, or deposited directly from $Al_2O_3$ sources by RF sputtering or ion-beam sputtering. A major shortcoming of metal-oxide gap insulator layers produced by this method is that the metal-oxide layers are required to be several hundred Angstroms thick in order be electrically insulating layers that are free from pinholes, through layer cracks or other defects that deteriorate their insulating properties. When the metal-oxide insulating gap layers have pinholes, through layer cracks or other defects, current leaks and electrical shorts will occur between a sensor element and the surrounding magnetic shields.

Because the gap insulator layers made by prior art methods are required to be relatively thick, they thermally insulate the integrated sensor element and prevent efficient dissipation of heat away from the sensor during operation of the device. Efficient dissipation of heat is required in order to operate a magnetic sensor device at high drive currents and improve the signal to noise ratio.

What is needed is a magnetic sensor device with a reduced gap thickness in order to increase the recording readback capabilities of the device for application with high areal densities. Further, there is a need for magnetic sensor devices that provide a mechanism to efficiently dissipate heat away from the sensor elements during read and write operations allowing for the use of higher drive currents to improve signal and reduce noise. There is also a need to provide an improved method for producing insulating gap layers of any thickness in laminated magnetic sensor devices

OBJECTS AND ADVANTAGES

Accordingly, it is a primary object of the present invention to provide a magnetic sensor device that has a thin oxidized metal insulator layer positioned between a magneto-resistive sensor or spin-valve sensor structure and a magnetic shield. Oxidized metal insulator layers, herein refers to metal-oxide metal nitrides, metal-oxy-nitrides, metal-fluorides, and other reactively formed metal compounds. The thin oxidized metal layer allows for a reduction in the overall thickness of the sensor device and increases its areal density recording and readback capabilities of the device.

It is a further object of the present invention to provide a magnetic sensor device that has a thin oxidized metal layer/metal layer gap insulator substructure laminated between a sensor element and a magnetic shield with the oxidized metal layer in contact with the sensor structure. Because the oxidized metal layer is thin and in contact with the sensor structure, heat generated at the sensor structure during operation of the sensor device can be more efficiently transferred to the metal layer. The metal layer acts as a heat sink to dissipate and draw heat away from the sensor structure. The sensor device with a thin oxidized metal layer in contact with the sensor and a metal layer underlay provides for a magnetic sensor device that can operate at higher drive currents leading to improved signal to noise ratios during reading and recording operations.

It is also an object of the present invention to provide a laminated magnetic sensor device with a plurality of oxidized metal/metal gap substructures. The plurality of oxidized metal/metal gap substructures again helps to efficiently dissipate heat away from the sensor element and allows the device to operate at higher drive currents leading to improved signal to noise ratios.

It is yet another object of the present invention to provide a method for producing high quality oxidized metal gap insulator layers of any thickness in laminated magneto-resistive and spin-valve sensor devices. The method of the current invention is to produce high quality oxidized metal insulator gap layers in sensor devices and reduce failures that result from pinholes, through layer cracks or other defects.

SUMMARY

The objects and advantages of the invention are achieved by providing a laminated magnetic sensor that has a magneto-resistive or spin-valve sensor element laminated between metal oxide insulating gap structures. At least one of the insulating gap structures contains an oxidized metal layer and/or an oxidized metal/metal underlay sub-structure, wherein the oxidized metal is formed by the oxidization, either partial or complete, of a previously deposited metal layer. For example, magnetic sensors of the current invention have gap structures that include oxidized metal layer/metal underlayer substructures of Al-oxide/Al, Ta-oxide/Ta, Co-oxide/Co, Fe-oxide/Fe, Ti-oxide/Ti, Ru-oxide/Ru, Si-oxide/Si, Cu-oxide/Cu, Ni-oxide/Ni, NiFe-oxide/NiFe or Cr-oxide/Cr.

Sensor devices according to the current invention, also have a plurality of oxidized metal layer/metal underlayer substructures within an insulating gap structure. Each one of the plurality of oxidized metal/metal substructures is made of the same oxidized metal/metal combination or different oxidized metal/metal combinations may be used for each of the substructures. Alternatively, a gap insulator structure may have substructures with a plurality of metal layers with one or more of the plurality of metal layers having a metal oxide-layer formed thereon, as described above.

The oxidized metal layer/metal underlayer substructures are formed by depositing a metal layer of Al, Ta, Co, Ti, Fa, Ru, Si, Cu, Ni, or Cr that is preferably 5 Angstroms thick or greater, so that it forms a continuous layer. The metal layer is subsequently oxidized to convert a portion of or all of the metal layer to the corresponding oxidized metal. In the case of an alloy metal layer, one of the components of the alloy may be preferentially oxidized to form the insulating layer. Oxidized metal layers produced by this method are typically very thin and thus provide for very little thermal insulation or afford good heat dissipation. However, because the oxidized metal layers are uniform in thickness and of high quality they are suitable dielectric separator layers in gap structures of magnetic sensing devices. Further, the remaining un-oxidized portion of the metal layer (the metal underlayer), if any, provides a conductive path for efficient dissipation of heat away from the sensor element, thus allowing the magnetic sensing devices of the current invention to operate at higher drive currents. Also, because oxidized metal layer/metal underlay substructures are thin the overall gap width of the device is reduced and the device can provide for higher areal data density access in a data storage system.

The method of the current invention is used to make oxidized metal gap insulator layers of any thickness. The gap insulator layers are metal oxides, metal nitrides and metal oxy-nitrides. In a particular embodiment of the invention an insulator gap structure is provided by oxidizing a portion of a metal layer to from a oxidized metal layer/metal underlayer substructure as previously described and in a subsequent step a thicker layer of oxidized metal is deposited thereon to any desired thickness.

DETAILED DESCRIPTION

Figure 1A:
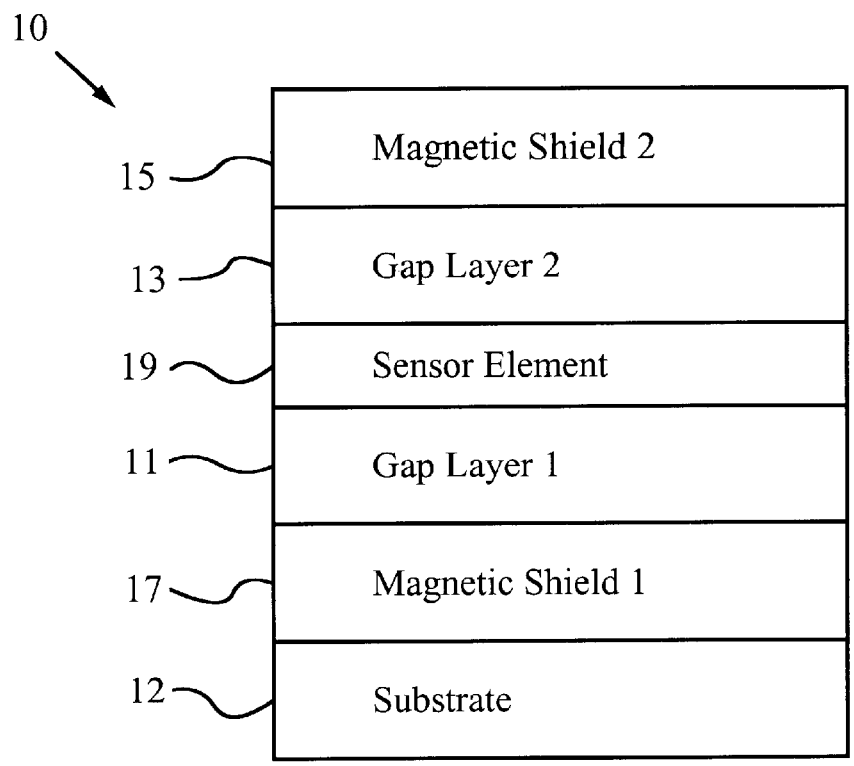
FIG. 1A illustrates a prior art structure for a magnetic sensing device.

FIG. 1a illustrates a typical magnetic sensor device 10. The magnetic sensor device 10 has a magnetic sensor element 19 laminated between two insulating gap layers 11 and 13. The sensor element 19 is either a multi-layer magneto-resistive sensor element or a spin-valve sensor element known in the art. The insulator gap layers 11 and 13 are laminated between two magnetic shields 15 and 17 made of NiFe alloy or other soft magnetic material. The sensor element 19, the insulating gap layers 11/13 and the magnetic shield layers 15/17 define the areal dimensions of the sensor device 10. The insulating gap layers 11 and 13 are metal-oxide layers that electrically insulate the sensor element 19 from the magnetic shields 15 and 17. The gap layers i and 13 are typically $Al_2O_3$ layers that are several hundred Angstroms thick. Most of the efforts to reduce the areal dimensions of magnetic sensor devices, such as the device described above, have been focused on reducing the thickness of the multi-layer sensor element 19. This approach is becoming increasingly difficult because many of the layers within the sensor element 19 are already less than fifty Angstroms in thickness. Again, referring to FIG. 1a, the magnetic sensor device 10 is fabricated by sequential deposition and patterning of the multiple layers that make up the structure 10 on a suitably prepared substrate 12, using various deposition and patterning techniques. First, the magnetic shield layer 17 is deposited, followed by deposition of the first gap layer 11, the formation of the sensor element, deposition of the second gap layer 13 and deposition of the capping magnetic shield 15.

Figure 1B:
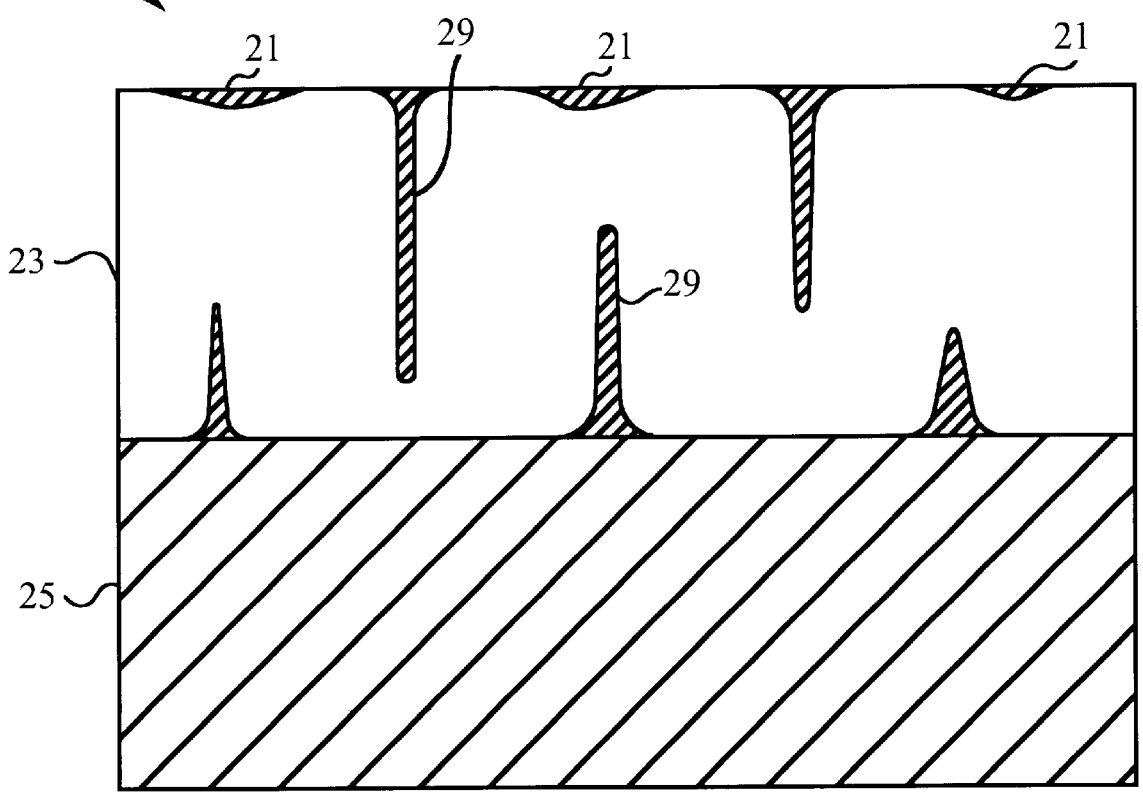
FIG. 1B illustrates some of the defects that occur in metal oxide layers that are deposited according to prior art methods.

One of the difficulties with producing insulating gap layers by methods described in the prior art is illustrated in FIG. 1b. The partial sensor structure 20 comprises a magnetic shield layer 25 with a metal oxide layer 23 that has been deposited by providing an atomized aluminum source in the presence of an oxygen rich environment to form the aluminum-oxide layer 23 on the magnetic shield layer 25. The resultant surface of the metal oxide layer 23 is generally rough with several surface defects 21. This is in part because $Al_2O_3$ is formed in a physical vapor phase above the surface of the magnetic shield layer 25 and on the surface of the magnetic shield layer 25 during the deposition process. The quality and surface topography of the oxidized metal layer 23 produced by this method is very sensitive to the reaction condition under which the layer 23 is formed. Additionally, deep defects 29, cracks or other defects are present in the resultant metal oxide layer 23 because the magnetic shield layer 25 is not a favorable substrate for the deposition of the $Al_2O_3$ layer 23, which is generally amorphous.

Because of the topographical and structural defects described above, the $Al_2O_3$ layer 23 generally must be deposited to several hundred Angstroms in thickness or electrical shorting will occur between the sensor element and the magnetic shields through cracks 29, deep defects or other defects. The invention provides a solution to the these problems, and allows for the fabrication of thin high quality gap insulator layers. Further, the gap substructures, described herein, provide for efficient dissipation of heat generated from an integrated sensor element during operation of the magnetic sensor device and allow the device to operate at higher drive currents.

Figure 2A:
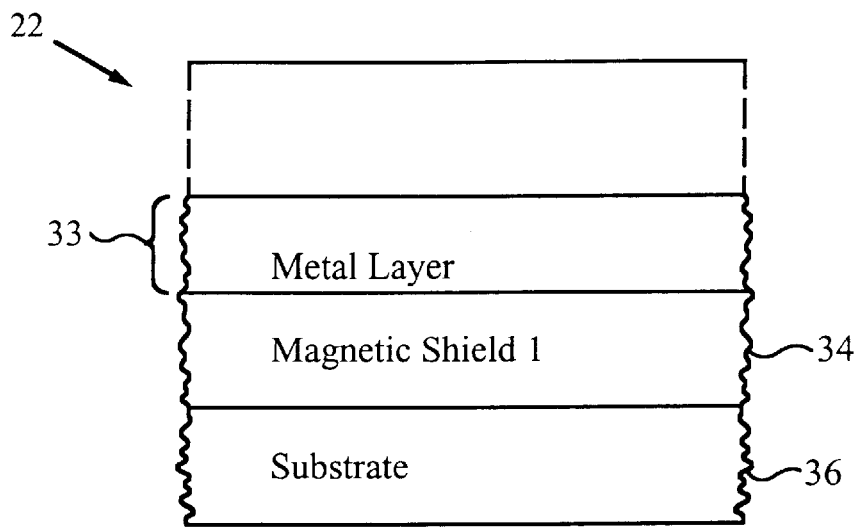
FIG. 2A–B illustrate laminated magnetic sensors device according the present invention.

FIG. 2a illustrates a partial magnetic sensor structure 22. A suitable substrate 36 is provided with a magnetic shield layer 34. The magnetic shield layer 34 is preferably a NiFe alloy layer or other soft magnetic material that has been previously deposited on the substrate 36. On the magnetic shield layer 34, a metal layer 33 is deposited to a thickness of between 5 and 200 Angstroms. The metal layer 33 is preferably a metal layer of Al, Si, Co, Ti, Ru, Ta, Cu. Ni, Cr, or alloys thereof.

Figure 2B:
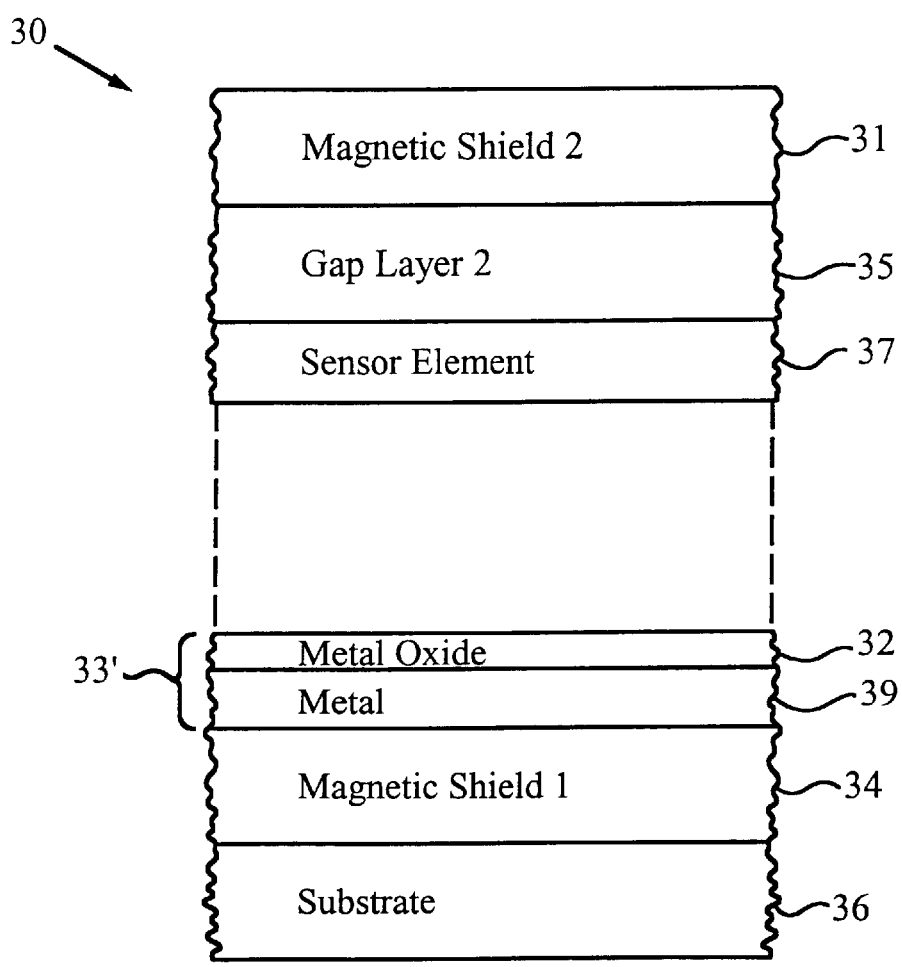

FIG. 2b shows a portion of a magnetic sensor structure 30. After depositing the metal layer 33 (shown in FIG. 2a) the metal layer 33 is partially oxidized to form a &oxidized metal/metal gap substructure 33'. The gap substructure 33' now has a, oxidized metal layer 32 and a metal underlayer 39. Alternatively, the metal layer 33 is completely oxidized leaving no metal underlayer. Because high quality metal layers can be deposited on the magnetic shield 34 layer, the oxidized metal layer 32 achieved by this method is also generally of high quality and relatively defect free. Thus the oxidized layer 32 provides good electrical insulation between the sensor element 37 and the magnetic shield 34 even though the oxidized metal layer 32 is very thin. In a preferred embodiment of the current invention a sensor element 37 is formed directly on the metal oxide-layer 32, followed by the deposition of gap layer 35 and magnetic shield layer 31.

Figure 3:
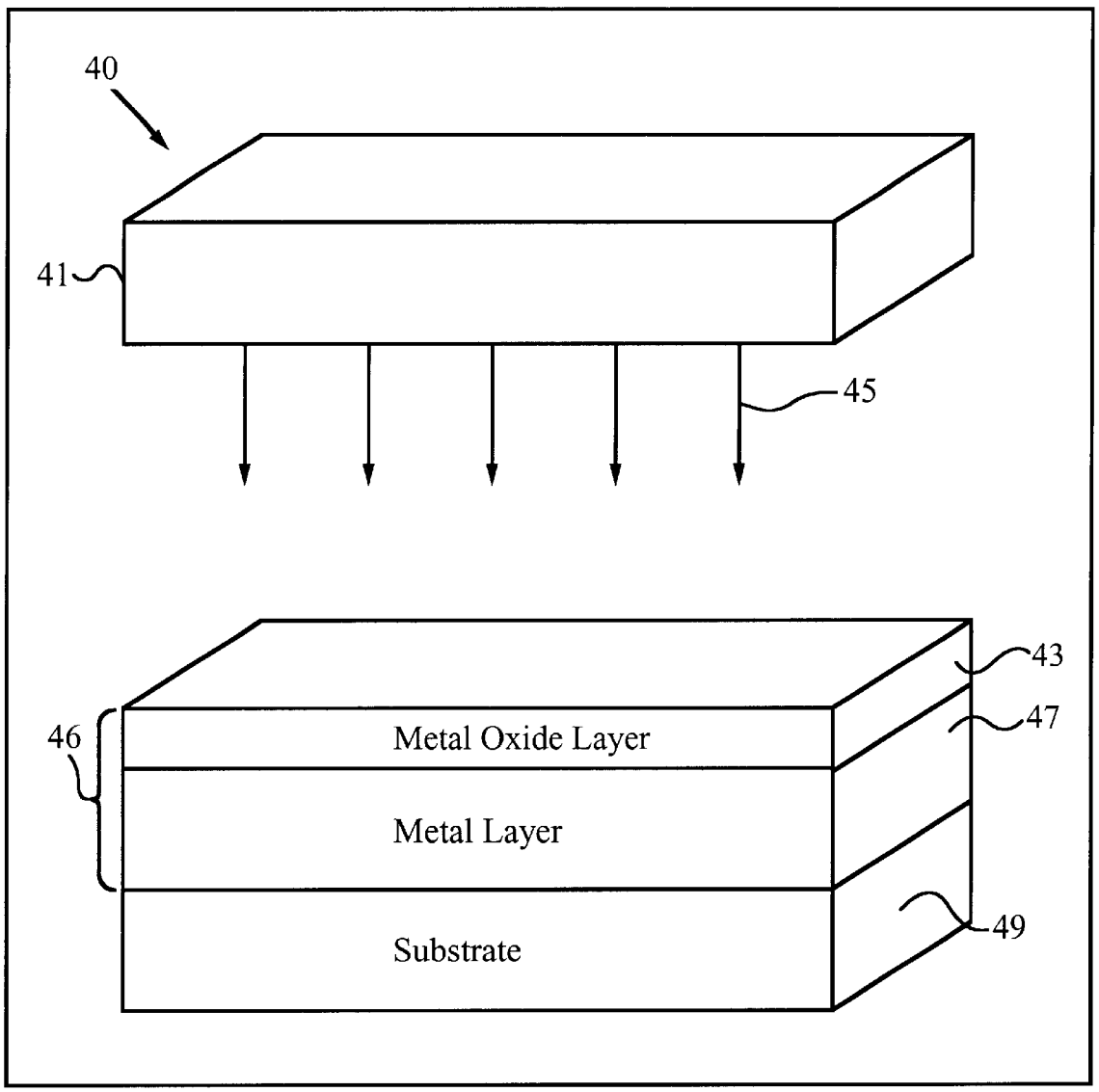
FIG. 3 illustrates a method for making oxidized metal/metal substructures used in gap structures according to the current invention.

FIG. 3 illustrates the general method for oxidizing a portion of or all of a metal layer. A metal layer 46 is deposited to any thickness on a suitable substrate 49. The substrate 49 and the metal layer 46 are placed into a reaction chamber environment 40 with a reactive oxidizing source 41. The reactive oxidizing source is directed towards a surface of the metal layer 46 and forms an oxidized metal layer 43 leaving an un-oxidized underlayer portion 47 of the metal layer 46. Alternatively, the metal layer 46 is completely oxidized leaving no metal underlayer. Alternatively, if the metal layer is an alloy, one of the alloy components may be preferentially oxidized to form an insulating layer. The reactive oxidizing source 41 is an oxygen plasma source, a reactive ion source, atomic oxygen source, molecular oxygen source, ozone source or another oxygen source capable of producing oxygen particles. The reactive oxidizing source is also a nitrogen source, such as an ammonia plasma, or a source that produces both reactive oxygen and nitrogen atom or particles. The reactive oxidizing source 41 is also a source of reactive fluorine or other atoms or particles. The thickness of the oxidized metal layer 43 produced by this method depends on the type of metal layer 46 deposited, the reactive oxygen source used and the reaction conditions. For example, when an aluminum metal layer is deposited to a thickness of 100 Angstroms or thicker and then exposed to an oxygen plasma source, the oxidized metal layer formed is typically 20 Angstroms thick or less. An oxidized metal layer that is 20 Angstroms thick may not provide sufficient separation or insulation for some applications in laminated magnetic sensor devices. In this case, additional metal oxide can be grown on the oxidized metal layer 43, as described below.

Figure 4:
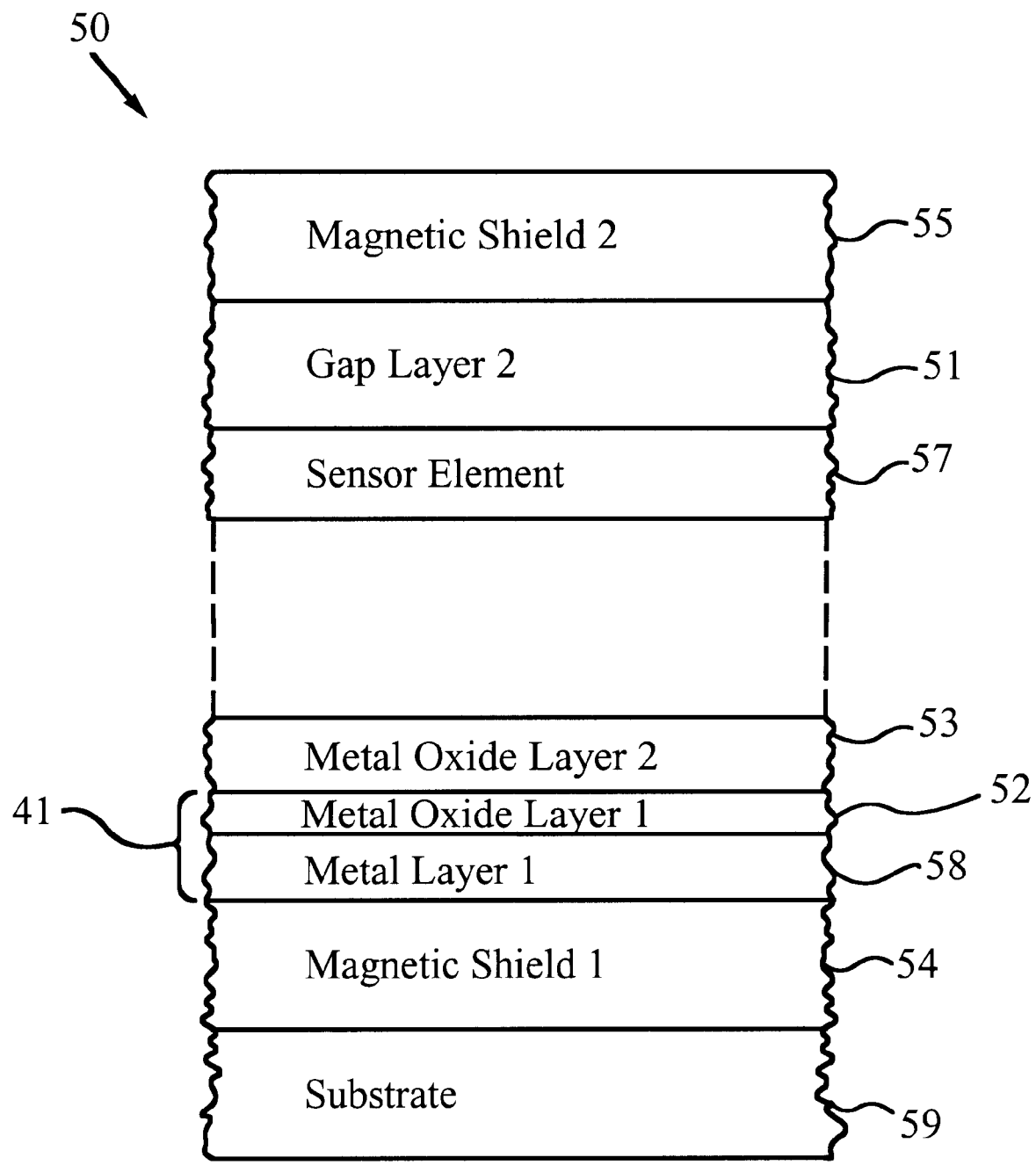
FIG. 4 illustrates an oxide insulator layer in a gap structure of a magnetic sensing device in accordance with the current invention.

FIG. 4 illustrates an alternative embodiment of the current invention. The magnetic sensor structure 50 is formed by providing a suitable substrate 59 and depositing a magnetic shield 54. A metal layer 41 is deposited on the magnetic shield 54 and a portion of the metal layer 41 is oxidized to form an oxidized metal layer 52 and an underlying metal layer 58. The oxidized metal layer 52 provides a suitable, high quality surface to deposit an additional metal-oxide, metal-nitride, metal-metal-fluoride or metal-oxy-nitride layer 53. Most preferably, the metal oxide layer 52 and the metal oxide layer 53 have similar chemical compositions to provide for good adhesion or surface coverage characteristics. However, it is considered to be within the scope of the current invention that the oxidized metal layer 52, formed by oxidation of a the metal layer 41, and the subsequently deposited oxidized metal layer 53, have different chemical compositions. The method described above is particularly useful to produce high quality gap insulator layers of any thickness, and is most useful in cases, where oxidation of a metal layer produces oxidized metal layers a few Angstroms thick, such as in the case of aluminum metal layers. The magnetic sensor device 50 is completed by forming the sensor element 57 on the second oxidized layer 53, followed by the deposition of a gap layer 51 and the magnetic shield 55.

Figure 5:
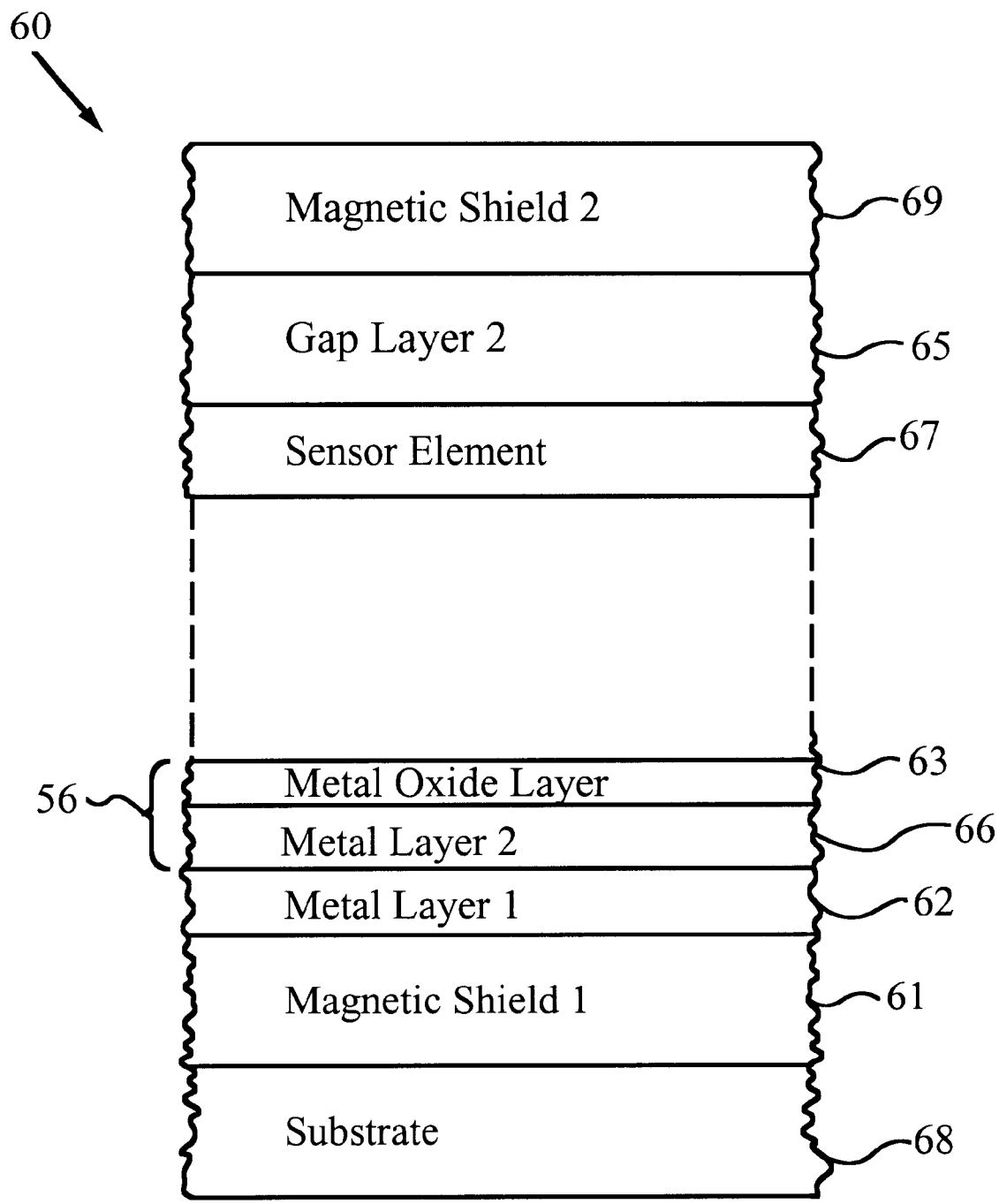
FIG. 5 shows a magnetic sensor device with a plurality of metal layers with a portion of one metal layer converted to a metal oxide layer.

FIG. 5 illustrates yet another embodiment of the current invention. A magnetic sensor 60 is formed by providing a substrate 68 and a magnetic shield 61, as described above. On the magnetic shield 61 a first metal layer 62 is deposited. On the first metal layer 62, a second metal layer 56 is deposited and a portion of the second metal layer is oxidized to form as, oxidized metal/metal substructure 63/66. The method described in this embodiment is useful under several circumstance. For example, if the metal layer 56 does not form a high quality defect free layer on the magnetic shield 61 due to poor lattice matching or chemical considerations, the metal layer 62 serves as an intermediate metal layer. Alternatively, there may be general engineering consideration or cost consideration for depositing one or more intermediate metal layers 62 on the magnetic shield 68. The remainder of the magnetic sensor device is fabricated by forming a sensor element 67 on the oxidized metal layer 63, followed by the deposition of the gap layer 65 and the capping magnetic shield 69.

Figure 6:
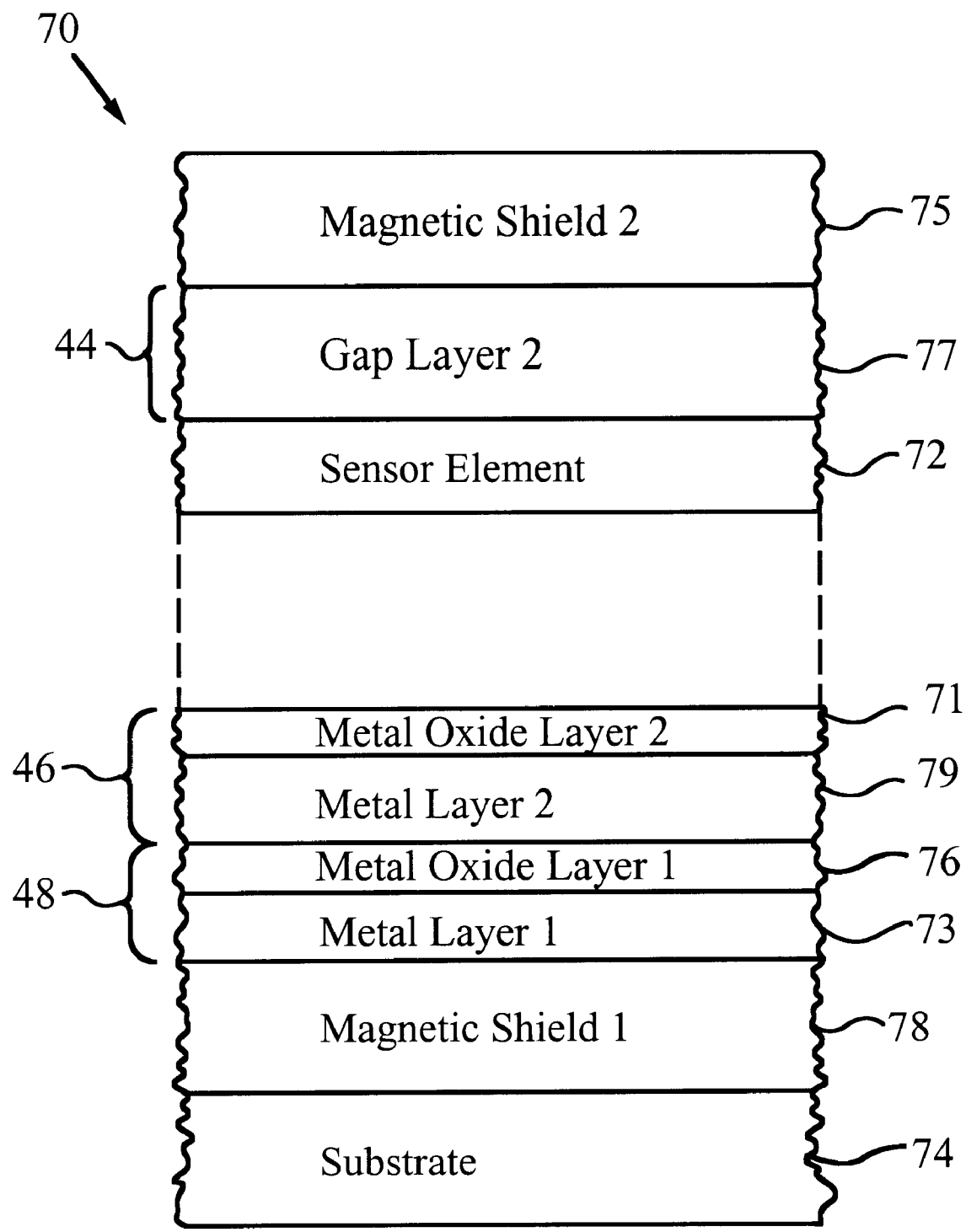
FIG. 6 shows a magnetic sensor device with a plurality of laminated oxidized metal layer/metal underlayer substructures.

FIG. 6 shows a magnetic sensor structure 70 with a plurality of oxidized metal/metal substructures. In this embodiment the magnetic sensor device 70 is formed by providing a substrate 74 with a magnetic shield layer 78 and depositing a first metal layer 48. A portion of the first metal layer 48 is oxidized to form a first oxidized metal/metal substructure 76/73. On the first oxidized metal/metal substructure 76/73, a second metal layer 46 is deposited. In a subsequent step a portion of the second metal layer 46 is oxidized to form a second oxidized metal/metal substructure 71/79 Any number of oxidized metal/metal substructures similar to substructures 76/73 and 71/79 may be deposited before sensor element 72 is formed. The sensor element is then formed on the oxidized metal layer 71, followed by the deposition of gap layer 77 and capping magnetic shield layer 75.

Figure 7:
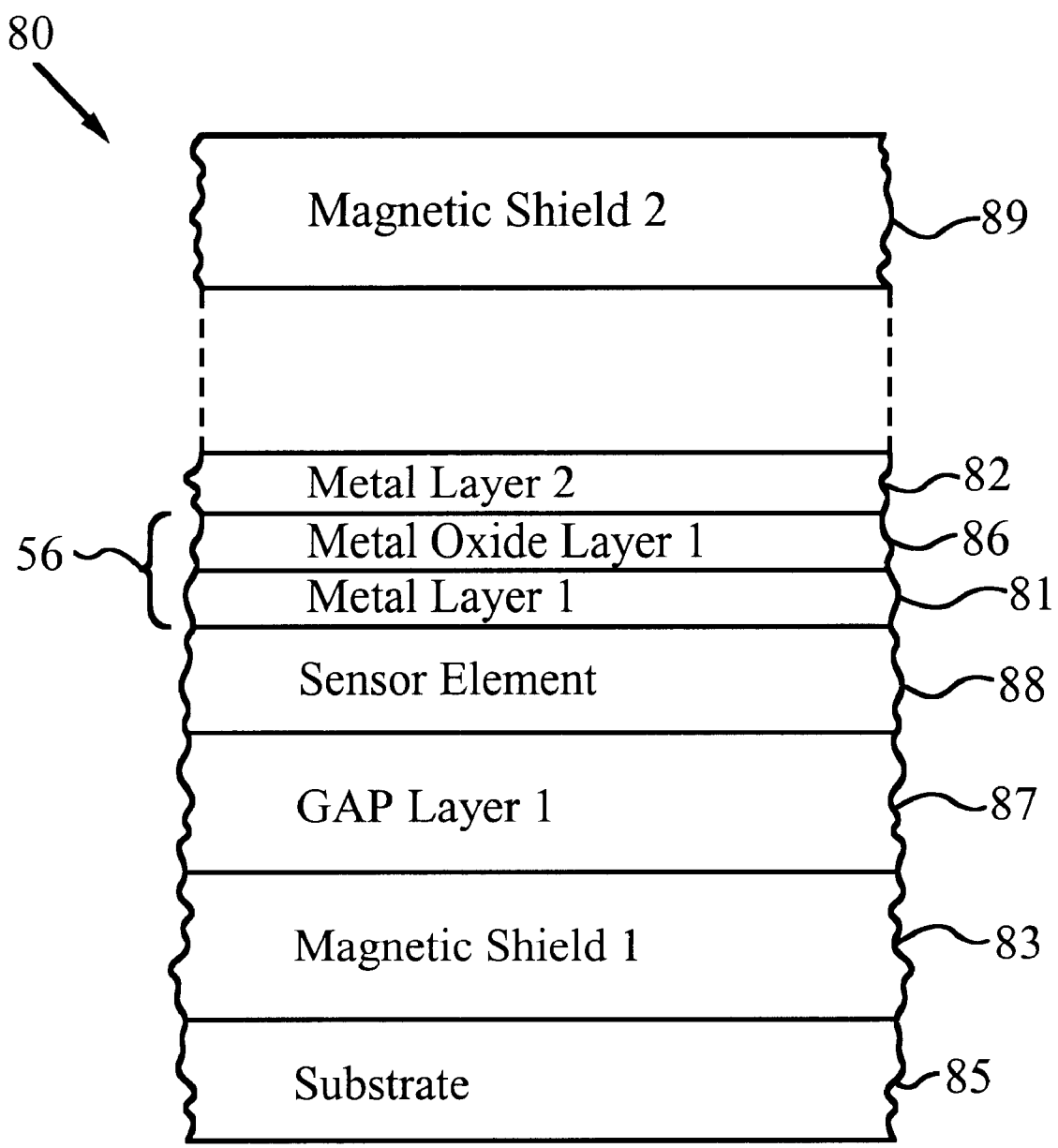
FIG. 7 illustrates a metal layer deposited on a sensor element and a portion of the metal layer converted to a metal oxide.

The magnetic sensors described above have integrated oxidized metal gap substructures that are formed prior to the formation of the sensor element. However, oxidized metal/metal substructures are equally beneficial when integrated into a gap structure after the formation of sensor elements. For example FIG. 7 illustrates a magnetic sensor structure 80 that is made by providing sensor element 88, that has been formed on a gap layer 87 produced by prior art methods or in accordance with the current invention. As before, the gap layer 87 is deposited on a magnetic shield layer 83 that has been deposited on a suitable substrate 85. In this embodiment, a first metal layer 84 is deposited on the sensor element 88. A portion of the metal layer is oxidized to form the oxidized metal/metal substructure 86/81. The capping magnetic shield 89 may then be deposited on the oxidized metal layer 86 or an intermediate metal layer 82 can be deposited prior to deposition of the capping magnetic shield layer 89.

The invention, as set forth above, describes the preferred embodiments. It will be clear to one skilled in the art that there are many variations that are within the scope of this invention.

What is claimed is:

1. A magnetic sensor device comprising;
   a) a first magnetic shield layer;
   b) a second magnetic shield layer;
   c) insulator gap layers laminated between said first and second magnetic shield layers, wherein at least one of said insulator gap layers is an oxidized metal insulator gap layer;
   d) a sensor structure laminated between said insulator gap layers and in contact with said oxidized metal insulator gap layer;

e) a first metal layer laminated between said oxidized metal insulator gap layer and said first magnetic shield layer; and f) a second metal layer laminated between said first magnetic shield layer and said first metal layer.

2. The magnetic sensor device of claim 1, wherein said first metal layer is selected from the group consisting of Al, Ta, Co, Fe, Si, Ti, Ru, Cu, Ni, and Cr.

3. The magnetic sensor device of claim 1, wherein said oxidized metal insulator gap layer is formed by oxidizing a portion of said first metal layer.

4. The magnetic sensor device of claim 1, wherein said second metal layer is selected from the group consisting of Al, Ta, Co, Fe, Si, Ti, Ru, Cu, Ni, and Cr.

5. The magnetic sensor device of claim 1, wherein said oxidized metal insulator gap layer is formed by oxidizing a portion of said second metal layer.

6. The magnetic sensor device of claim 5, further comprising a metal oxide layer laminated between said first metal layer and said second metal layer.

7. The magnetic sensor device of claim 6, wherein said metal oxide layer is formed by oxidizing a portion of said first metal layer.

8. The magnetic sensor device of claim 1, wherein said oxidized metal insulator gap layer is between 5 and 200 Angstroms thick.

9. The magnet-c sensor device of claim 1, wherein said magnetic shield layers comprise NiFe alloy.

10. The magnetic sensor device of claim 1, wherein said sensor element is selected from the group consisting of a magneto-resistive sensor and a multi-layer spin valve sensor.

11. A method of making a magnetic sensor device, said method comprising the steps of;

a) providing a first magnetic shield layer;

b) providing a first gap structure on said first magnetic shield layer, said first gap structure comprising a metal layer;

c) oxidizing a portion of said metal layer to from an oxidized metal insulator gap layer;

g) growing a metal oxide-layer on said oxidized metal insulator gap layer;

d) forming a sensor structure capable of sensing magnetic data bits;

e) providing a second gap structure; and f) providing a second magnetic shield layer;

whereby, said sensor structure is laminated between said first and said second gap structures.

12. The method of claim 11, wherein said metal layer is a metal selected from the group consisting of Al, Ta, Co, Fe, Si, Ti, Ru, Cu, Ni, and Cr.

13. The method of claim 11, wherein said portion of said metal layer is oxidized by exposing said metal layer to an oxygen source, said oxygen source being selected from the group consisting of an oxygen plasma, an oxygen ion beam, an atomic oxygen source, a molecular oxygen source and an ozone source.

14. A method of making a magnetic sensor device, said method comprising the steps of;

a) providing a first magnetic shield layer;

b) providing a first gap structure on said first magnetic shield layer, said first gap structure comprising a metal layer;

c) oxidizing a portion of said metal layer to from an oxidized metal insulator gap layer;

g) depositing a second metal layer on said oxidized metal gap insulator layer;

d) forming a sensor structure capable of sensing magnetic data bits;

e) providing a second gap structure; and f) providing a second magnetic shield layer;

whereby, said sensor structure is laminated between said first and said second gap structures.

15. The method of claim 14, further comprising the (h) of oxidizing a portion of said second metal layer prior to the step (d) of forming said sensor structure.

16. The method of claim 14, wherein said second metal layer is selected from the group consisting of Al, Ta, Co, Fe, Si, Ti, Ru, Cu, Ni, and Cr.

17. The method of claim 14, wherein said metal layer is a metal selected from the group consisting of Al, Ta, Co, Fe, Si, Ti, Ru, Cu, Ni, and Cr.

18. The method of claim 14, wherein said portion of said metal layer is oxidized by exposing said metal layer to an oxygen source, said oxygen source being selected from the group consisting of an oxygen plasma, an oxygen ion beam, an atomic oxygen source, a molecular oxygen source and an ozone source.

* * * * *